United States Patent
LaMarca et al.

(10) Patent No.: US 7,984,738 B2
(45) Date of Patent: *Jul. 26, 2011

(54) TEMPERATURE CONTROLLED POLYMER COMPOSITION FOR INDUCTIVE CONTROL HEATING USING ELECTRICAL CONDUCTIVE AND MAGNETIC PARTICLES

(75) Inventors: Drew P. LaMarca, Whippany, NJ (US); Bryan Agosto, North Bergen, NJ (US)

(73) Assignee: Emabond Solutions LLC, Norwood, NJ (US)

( * ) Notice: Subject to any disclaimer, the term of this patent is extended or adjusted under 35 U.S.C. 154(b) by 277 days.

This patent is subject to a terminal disclaimer.

(21) Appl. No.: 11/983,961

(22) Filed: Nov. 13, 2007

(65) Prior Publication Data
US 2009/0004466 A1    Jan. 1, 2009

Related U.S. Application Data

(60) Provisional application No. 60/937,401, filed on Jun. 26, 2007.

(51) Int. Cl.
*B29C 65/02* (2006.01)
(52) U.S. Cl. ............... 156/359; 156/272.2; 156/379.6; 219/633; 524/439
(58) Field of Classification Search .......... 156/366, 156/64, 272.2, 359, 379.6; 219/633; 524/439; 700/299, 300
See application file for complete search history.

(56) References Cited

U.S. PATENT DOCUMENTS

| | | | | |
|---|---|---|---|---|
| 5,350,902 A | * | 9/1994 | Fox et al. | 219/633 |
| 5,504,309 A | * | 4/1996 | Geissler | 219/663 |
| 5,643,390 A | | 7/1997 | Don et al. | |
| 5,770,982 A | | 6/1998 | Moore | |
| 5,780,536 A | * | 7/1998 | Yokoyama et al. | 524/439 |
| 6,048,599 A | | 4/2000 | Chu et al. | |
| 6,056,844 A | | 5/2000 | Guiles et al. | |
| 6,137,093 A | | 10/2000 | Johnson, Jr. | |
| 6,323,468 B1 | * | 11/2001 | Dabelstein et al. | 219/617 |
| 6,939,477 B2 | | 9/2005 | Stark et al. | |
| 7,147,742 B2 | | 12/2006 | Kirsten | |
| 2003/0031699 A1 | | 2/2003 | Van Antwerp | |
| 2004/0129924 A1 | * | 7/2004 | Stark | 252/500 |
| 2006/0091136 A1 | * | 5/2006 | Weiss et al. | 219/666 |

FOREIGN PATENT DOCUMENTS
WO    WO 03/063548    7/2003

OTHER PUBLICATIONS

International Search Report corresponding to International Application No. PCT/US08/07946 filed Jun. 25, 2008 (2 pages).
Written Opinion of the International Searching Authority corresponding to International Application No. PCT/US08/07946 filed Jun. 25, 2008 (5 pages).

* cited by examiner

*Primary Examiner* — Khanh Nguyen
*Assistant Examiner* — Vishal I Patel
(74) *Attorney, Agent, or Firm* — Wolff & Samson PC

(57) ABSTRACT

A polymer composition with a polymer matrix material and magnetic particles. The composition is selectively electromagnetically heatable by an electrical induction energy frequency that is pulse width modulated through variable time cycles to provide controlled heating.

8 Claims, 2 Drawing Sheets

TEMPERATURE CONTROLLED POLYMER COMPOSITION FOR INDUCTIVE CONTROL HEATING USING ELECTRICAL CONDUCTIVE AND MAGNETIC PARTICLES

This application claims the benefit of Provisional Application 60/937,401 filed Jun. 26, 2007, the contents of which are incorporated herein by reference.

BACKGROUND OF THE INVENTION

The present invention relates to polymer induction bonding. Such bonding is used to encapsulate, weld, forge, bond or set polymer materials.

Current materials used for such bonding are made from a plastic polymer compounded with magnetic particles and heated through an electrical induction energy frequency at a fixed Khz to Mhz single frequency. The material is manufactured as pellet and solid profile material. There are limits in applying the welding material due to the geometry and access in the application specific assembly. The size of the material pellet and profile also limits the application into the assembly.

Various types of materials are known for induction bonding. For example, U.S. Pat. No. 6,048,599 discloses a sheet material for electromagnetic fusion bonding which comprises a plurality of composite electromagnetic portions including susceptor particles uniformly distributed adjacent polymer portions. The composite portions are bonded to each adjacent polymer portion so that the composite portions and the polymer portions form a patterned array of alternating portions.

U.S. Pat. No. 6,056,844 discloses controlled-temperature induction heating of polymeric materials by mixing ferromagnetic particles in the polymer to be heated. Temperature control is obtained by selecting ferromagnetic particles with a specific Curie temperature (Tc). The ferromagnetic particles heat up in an induction field, through hysteresis losses, until they reach their Curie temperature (Tc). At that point, heat generation through hysteresis loss ceases.

U.S. Pat. No. 6,939,477 discloses a temperature-controlled induction heating of polymeric materials wherein an induction coil, which generates a magnetic field, is placed near the material and heats a susceptor, such as a metal screen or powder, within the material to be heated. To improve the induction heating process, the susceptor design is optimized for effective fusion bonding or welding of thermoplastic layers, the method of mixing or placing the susceptor particles within a composite matrix is optimized, and the power infrequency of the induction device are optimized.

U.S. Pat. No. 5,643,390 discloses bonding techniques for high performance thermal plastic compositions in which a thermoplastic material and a thermosetting monomer are selected so that the thermosetting monomer has similar solubility parameters to the thermoplastic material. The thermoplastic material is bonded directly to the surface of the thermosetting monomer to create a co-cured layered material which is processed with either a thermoset adhesive or bonded by fusion.

U.S. Pat. No. 6,137,093 discloses high efficiency heating agents that consist of ferromagnetic fibers for use in alternating magnetic fields.

These prior art induction heating techniques, as well as other known techniques, can provide very fast heating and bonding rates, but exhibit poor control of bond-line temperatures.

SUMMARY OF THE INVENTION

It is an object of the present invention to improve upon the prior art and provide a composition that can be controlled by pulse width modulation (PWM) during use as a bonding material.

The present invention provides a new polymer induction bonding technology. Induction heating technologies are utilized to encapsulate, weld, forge, bond or set polymer materials using fixed time duration (ON/OFF) from an electrical energy induction source. The present invention provides controlled temperature induction heating of polymer matrix materials by variable time of the electrical induction energy using pulse width modulated (PWM) variable time cycle(s).

The control of the polymer matrix heating using the variable inductive magnetic field is from the heat generated by conductive or magnetic materials in the polymer matrix. These inductive materials are mixed in a polymer compatible matrix which can have the consistency of a liquid to a solid and reacts to the induction energy pulse width modulation. These frequency dependant particles will heat up in this induction field at a specified temperature or temperature profile based on the amount of delivered inductive energy.

Induction heat is generated through hysteresis loss ceases from ferromagnetic materials or eddy currents (skin effect) of non magnetic or electrically conductive materials. The invention is applicable to bonding thermoplastic materials or thermoset composites and curing thermoset adhesives and encapsulates using composite resins or polymers by the means of the inductive polymer matrix and the time cycle pulsing of the electrical induction energy.

The present invention allows the use of new liquid, gel, powder or solid type material to be compatible in the application specific assembly.

The novelty of the new materials starts with nano size structures to micron size inductive materials coated with a specified polymer and compounded into polymer matrix pellets. The compounded pellets are used in multiple ways, as stated below.

Liquids and Gels—Compounded polymer matrix pellets are processed to a powder size of greater than or equal to 1 micron. Liquids and gels are based on a composition of electromagnetic bonding powder and a viscous surface tension promoter to form a pliable polymer matrix for encapsulating, setting, bonding and welding based on the method of dispensing the liquid or gel.

Powders—Compounded polymer matrix pellets are processed to a powder size of greater than or equal to 1 micron in size. The powders are applied using powder dispensers, heat dispensing or spray.

Pellets—as polymer matrix pellets for application specific processing.

Profile—polymer matrix pellets are compounded into solid forms.

Polymer Structures—polymer matrix pellets can be processed with polymer processing equipment or techniques with other polymers and inductive materials (example, films and sheets) for specialized heating.

The novelty of this electro-magnetic precision heating is variable induction time using the electrical induction energy frequency at the fixed Khz to Mhz single frequency being pulse width modulated through variable time cycle(s) which creates a precision electromagnetic heating process. The electrical energy transfer into inductive heating is controlled through the total energy absorbed by the electrically conductive or magnetic particle over time.

The interaction of the electromagnetic field with susceptor particles in a polymer matrix produces targeted heating on command.

The inventive process generates uniform heat inside one or multiples of a dimensional layer of plastic welding material. This reduces adverse effects, such as thermal degradation and thermally induced residual stress, while offering advantages relative to compact shear joint design, speed and energy efficiency.

Other features and advantages of the present invention will become apparent from the following description of the invention

DETAILED DESCRIPTION OF THE INVENTION

Figure 1:
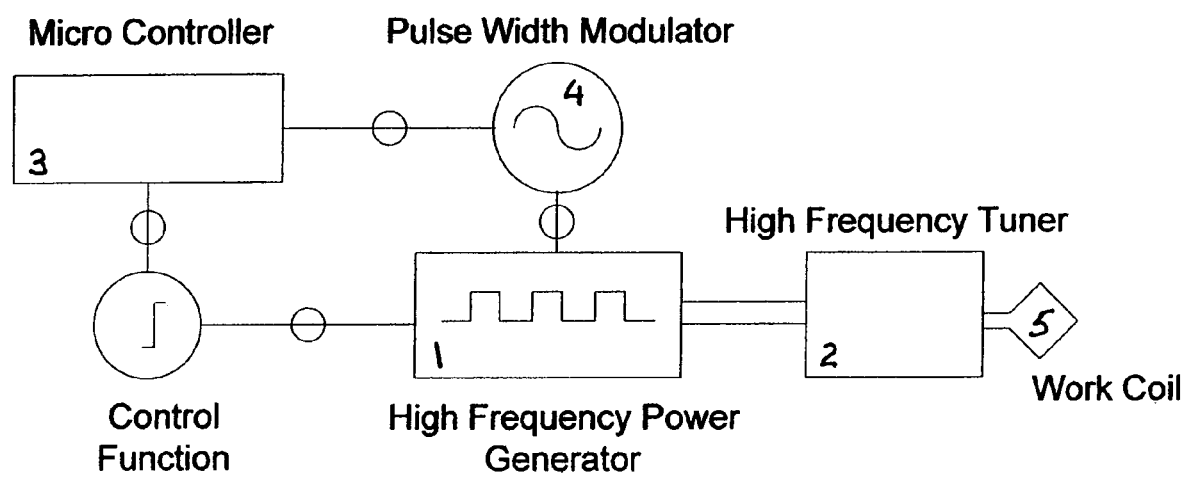
FIG. 1 is a schematic showing the equipment of the system for carrying out bonding using the inventive polymer composition.

The use of the inventive temperature controlled polymer composition for inductive control heating using electrically conductive and magnetic particles will be described below.

A high frequency match impedance tuner 1 and a generator 2 that receives desired inductive heat response commands from control signals generated by a microcontroller 3 for a desired inductive energy response. Each control signal represents a desired time frequency and desired duty cycle. The high frequency power circuit receives the control signals 4 and generates fixed or variable frequency pulse width modulation signals in response. Each frequency pulse width modulated signal has one of at least two fixed frequencies corresponding to the desired magnetic heat effect and has one of a plurality of active duty cycles corresponding to the desired duty cycle to achieve the level of inductive power to control the heating of electrically conductive and magnetic particles. The duty cycles can range from 0 to 100%.

The magnetic field work coil 5 receives the fixed or variable frequency pulse width modulated signals from the high frequency power generator circuit to control the magnetic field flux density of the work coil 5.

The high frequency power generator circuit operates from 80 KHz to 30 Mhz.

The polymer composition of the invention for controlling temperature induction heating comprises at least one polymer matrix material and magnetic or electrically conductive particles, where the particles are greater than or equal to about 10 nanometers in size.

In one embodiment of the polymer composition, the electrically conductive and magnetic particles are evenly distributed in the polymer matrix material.

In another embodiment of the polymer composition, the polymer matrix material has particles greater than or equal to about 1 micron in size, to a manufactured solid profile.

The polymer composition can have the electrically conductive and magnetic particles present from about 1% to about 75% or greater by weight, depending on the base polymer reaction.

In still a further embodiment of the polymer composition the polymer matrix material comprises a thermoplastic material.

The thermoplastic material can be poly(etheretherketone), polyetherketoneketone, poly(etherimide), polyphenylene sulfide, poly(sulfone), polyethylene terephthalate, polyester, polyamide, polypropylene, polyurethane, polyphenylene oxide, polycarbonate, polypropylene/polyamide, polypropylene/ethylene vinyl alcohol, polyethylene, polyolefin oligomers, liquid modified polyolefins or combinations thereof.

In a further embodiment of the polymer composition the Curie temperature (Tc) of the electrically conductive and magnetic particles is greater than the melting temperature of the polymer matrix material.

The polymer composition can also include a viscous polymer matrix material that can comprise a solvent or alcohol solution, aqueous dispersions, the micron sized polymer matrix particles and oxygenated coatings.

It is also possible for the thermoset composition to have a viscous thermoset matrix material that comprises a thermoset adhesive or encapsulate and micron sized polymer matrix particles.

Furthermore, the Curie temperature (Tc) of the micron sized polymer matrix particles is greater than the curing temperature of the thermoset composition material.

Essentially, the conductive particles in the polymer matrix composition are controlled by varying the pulse width modulation (PWM) whereby the heating of the composition and magnetic particles can be precisely controlled.

Figure 2:
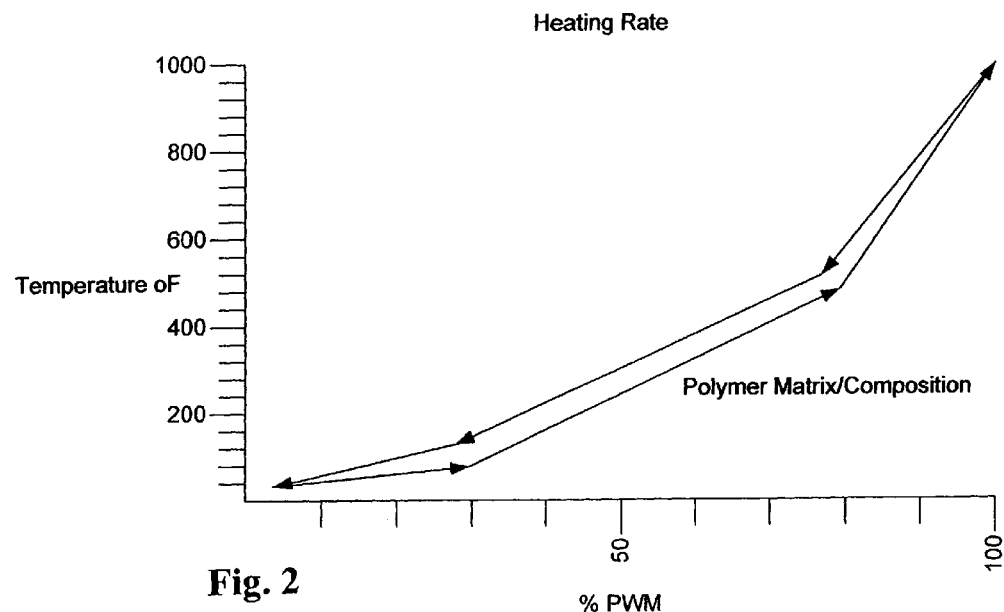
FIG. 2 is a diagram showing an example of the heating rate using the inventive composition.

FIG. 2 illustrates a diagram showing the heating rate during pulse width modulation (PWM). As can be seen from the diagram, as the percentage of pulse width modulation (PWM) increases from 0-30% the temperature of the polymer matrix increases slightly. As the percent of pulse width modulation increases to 80% the temperature of the polymer matrix/composition increases uniformly. Then, when the percent of pulse width modulation is increased to 100% there is a more dramatic increase in the temperature of the matrix/composition. A similar trend in the opposite direction is encountered when the percent of the pulse width modulation is once again reduced.

Figure 3:
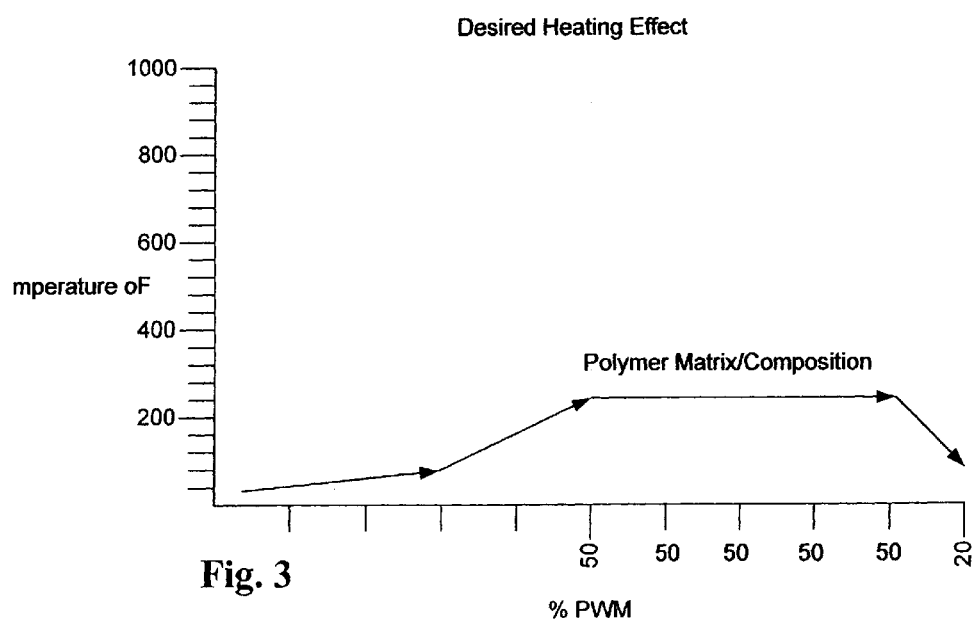
FIG. 3 is a diagram showing heating effect.

FIG. 3 gives an example in which the desired heating effect is controlled by utilizing the percent of pulse width modulation. As can be seen, initially the percent of pulse width modulation is increased gradually, which is accompanied by gradual increase in temperature. Next there is a more pronounced increase of the pulse width modulation to 50% where the temperature reaches, in this example, approximately 250°. This temperature is maintained by maintaining the percentage of pulse width modulation at 50%. Once the bonding or welding is completed and the heating is no longer required, the pulse width modulation percentage is again reduced which is accompanied by a decrease in temperature.

The above examples are merely representative of the type of control which is available for heating the polymer matrix for bonding purposes. Of course, the percent of pulse width modulation and the temperature would vary from application to application depending on the materials used in the polymer matrix composition, as well as the components which are to be bonded or fused together.

Although the present invention has been described in relation to particular embodiments thereof, many other variations and modifications and other uses will become apparent to those skilled in the art. It is preferred, therefore, that the present invention be limited but by the specific disclosure herein, but only by the appended claims

The invention claimed is:

1. A method for controlled temperature bonding with a polymer composition comprising magnetic particles dispersed in a polymer matrix material, the method comprising the steps of:

generating electromagnetic induction energy having an electromagnetic induction energy frequency selected from the range of 80 kHz to 30 MHz;

pulse width modulating the electromagnetic induction energy to generate a first pulse width modulated electromagnetic energy having a pulse width modulation frequency and a first duty cycle selected from a plurality of duty cycles;

heating the polymer composition with the first pulse width modulated electromagnetic induction energy for a first heating interval;

pulse width modulating the electromagnetic induction energy to generate a second pulse width modulated electromagnetic induction energy having the pulse width modulation frequency and a second duty cycle selected from the plurality of duty cycles; and heating the polymer composition with the second pulse width modulated electromagnetic induction energy for a second heating interval.

2. The method according to claim 1, wherein the polymer composition further comprises electrically conductive particles dispersed in the polymer matrix material.

3. The method according to claim 2, wherein the electrically conductive and magnetic particles are evenly distributed in the polymer matrix material.

4. The method according to claim 1, wherein the plurality of duty cycles range from 0-100%.

5. The method according to claim 1, further comprising the steps of:

disposing the polymer composition between a first component and a second component; and fusing the first component to the second component with the polymer composition.

6. The method according to claim 5, wherein:
the first component comprises one of:
a first thermoplastic material; and
a first thermoset material; and
the second component comprises one of:
a second thermoplastic material; and
a second thermoset material.

7. The method of claim 1, wherein the first duty cycle and the second duty cycle are different.

8. The method of claim 1, wherein the first heating interval and the second heating interval are different.

* * * * *